A. STILLMAN.
Coffee Roaster.
No. 1,919. Patented Dec. 28, 1840.
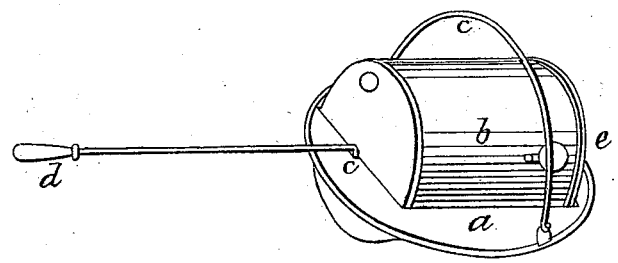

UNITED STATES PATENT OFFICE.

ABEL STILLMAN, OF POLAND, NEW YORK.

COFFEE-ROASTER.

Specification of Letters Patent No. 1,919, dated December 28, 1840.

*To all whom it may concern:*

Be it known that I, ABEL STILLMAN, of Poland, in the county of Herkimer and State of New York, have invented a new and useful Improvement in Coffee-Roasters, and that the following is a full and exact description of the same.

My improvement consists in casting a rim or plate, $a$, as shown in the drawing; it is like the common griddle or cover used in kitchen stoves, with the exception of a hole nearly square through the center and sufficiently large to receive the cylinder $b$, with the bearings $e\ e$ on opposite sides of the hole, on which rests the axis of the cylinder, and in which it revolves. The cylinder is of sheet iron, from five to ten inches in length and the same in diameter, with cast iron heads, and a shaft through the center about three eighths of an inch in diameter—extending out at one end of the cylinder of sufficient length to rest on the bearing $e$, and the other end extending out eighteen inches or more on which is a handle or crank for the convenience of the operator; in the end of the cylinder toward the handle is a small hole in which is a plate of mica or other transparent substance, the object of which is to enable the operator to have a more perfect view of the coffee while in the process of roasting. Near the other end of the cylinder is a hole about two inches in diameter closed with a slide of sheet iron, through which the coffee is inserted and taken out when roasted, the coffee roaster may be used with the stove, portable furnace, or suspended over the fire by the bail $c$.

I do not claim as my invention the combination of a cylinder for roasting coffee with a vessel adapted to the boiler openings of a stove said vessel having a bottom to it, so as to exclude the fire from the roaster.

What I claim is—

Combining the coffee roaster with a rim or vessel open below so as to admit the fire to the roaster and adapted to the stove, portable furnace, or fire-place as herein set forth, and the insertion of a piece of mica or other transparent substance in the end of the cylinder.

ABEL STILLMAN.

Witnesses:
W. C. DURANT,
ALBERT ARNOLD.